(12) United States Patent
Davidian et al.

(10) Patent No.: US 12,179,309 B2
(45) Date of Patent: Dec. 31, 2024

(54) MANDREL AND ACCESSORY FOR ROTARY TOOL

(71) Applicant: TECHTRONIC CORDLESS GP, Anderson, SC (US)

(72) Inventors: Richard M. Davidian, Pickens, SC (US); Drew A. Dahill, Pendleton, SC (US); J. Mike King, Inman, SC (US)

(73) Assignee: Techtronic Cordless GP, Anderson, SC (US)

( * ) Notice: Subject to any disclaimer, the term of this patent is extended or adjusted under 35 U.S.C. 154(b) by 92 days.

(21) Appl. No.: 17/696,713

(22) Filed: Mar. 16, 2022

(65) Prior Publication Data

US 2022/0297202 A1 Sep. 22, 2022

Related U.S. Application Data

(60) Provisional application No. 63/185,829, filed on May 7, 2021, provisional application No. 63/162,632, filed on Mar. 18, 2021.

(51) Int. Cl.
*B24B 45/00* (2006.01)
*B23B 31/113* (2006.01)
*B23B 31/00* (2006.01)

(52) U.S. Cl.
CPC .......... *B24B 45/006* (2013.01); *B23B 31/113* (2013.01); *B23B 31/005* (2013.01);
(Continued)

(58) Field of Classification Search
CPC ................. B24B 45/006; B23B 31/113; B23B 2231/0204; B23B 2260/106;
(Continued)

(56) References Cited

U.S. PATENT DOCUMENTS 1,941,840 A    1/1934    Kelsey
3,197,219 A *    7/1965    Wahlstrom ............ B23B 31/113
                                                    279/91
(Continued)

FOREIGN PATENT DOCUMENTS

CN    109465716 A    3/2019
CN    109623653 B    4/2020
(Continued)

OTHER PUBLICATIONS

Extended European Search Report for Application No. 22163098.1 dated Nov. 29, 2022 (8 pages).

*Primary Examiner* — Eric A. Gates
(74) *Attorney, Agent, or Firm* — Michael Best & Friedrich LLP

(57) ABSTRACT

A rotary tool mandrel includes a shaft, locking projections, a collar, and a fastener. The shaft extends along a longitudinal axis and includes a distal end. The locking projections protrude radially relative to the longitudinal axis and positioned on opposite sides of the longitudinal axis from one another. Each of the locking projections define a locking projection outer profile that is rectilinear. The collar is coupled to the shaft and includes a pair of coupling projections protruding from a surface of the collar adjacent the distal end of the shaft. The coupling projections are angularly offset from the locking projections with respect to the longitudinal axis. Each of the coupling projections define a coupling projection that is rectilinear. The fastener is coupled to the shaft and movable relative to the shaft along the longitudinal axis, and movement of the fastener causes the locking projections to move toward the coupling projections.

21 Claims, 15 Drawing Sheets

(52) U.S. Cl.
CPC . *B23B 2231/0204* (2013.01); *B23B 2260/106* (2013.01); *B23B 2260/112* (2013.01); *B23B 2260/138* (2013.01)

(58) Field of Classification Search
CPC ........ B23B 2260/112; B23B 2260/138; B25G 3/16; Y10T 279/30
See application file for complete search history.

(56) References Cited

U.S. PATENT DOCUMENTS

| | | | |
|---|---|---|---|
| 3,623,281 A | 11/1971 | Moffat | |
| 3,679,220 A * | 7/1972 | Reeves | B23B 31/113 279/904 |
| 5,061,129 A * | 10/1991 | Baudermann | B23B 31/113 409/234 |
| 5,407,293 A * | 4/1995 | Crainich | F16B 7/20 403/348 |
| 5,667,228 A * | 9/1997 | Fabris | B23B 31/113 279/143 |
| 5,839,950 A | 11/1998 | Johansson Edling et al. | |
| 6,254,303 B1 * | 7/2001 | Falat | B23B 31/113 403/321 |
| 6,796,888 B2 | 9/2004 | Jasch | |
| 6,945,862 B2 | 9/2005 | Jasch et al. | |
| 7,207,873 B2 | 4/2007 | Hesse et al. | |
| 7,387,563 B2 | 6/2008 | Allemann et al. | |
| 7,438,634 B2 | 10/2008 | Habele | |
| 7,484,736 B2 | 2/2009 | Allemann et al. | |
| 7,614,940 B2 | 11/2009 | Jerome et al. | |
| 7,959,497 B2 | 6/2011 | Guenther et al. | |
| 8,096,855 B2 | 1/2012 | Jerome et al. | |
| 8,585,469 B2 | 11/2013 | Grunikiewicz | |
| 8,608,530 B2 | 12/2013 | Hofmann et al. | |
| 8,858,301 B2 | 10/2014 | Reid | |
| 8,925,931 B2 | 1/2015 | Sergyeyenko et al. | |
| 9,067,293 B2 | 6/2015 | Bernardi et al. | |
| 9,186,770 B2 | 11/2015 | Montplaisir et al. | |
| 9,193,045 B2 * | 11/2015 | Saur | B25B 21/00 |
| 9,403,216 B2 * | 8/2016 | Olsson | B23B 31/113 |
| 9,539,647 B2 | 1/2017 | Sergyeyenko | |
| 9,694,472 B2 | 7/2017 | Luescher et al. | |
| 9,718,165 B2 * | 8/2017 | Hesse | B24B 55/05 |
| 9,796,064 B2 | 10/2017 | Holiness-Stalling et al. | |
| 9,879,729 B2 | 1/2018 | Hesse et al. | |
| 10,105,816 B2 | 10/2018 | Kim et al. | |
| 10,124,461 B2 | 11/2018 | Kuehne et al. | |
| 10,179,381 B2 | 1/2019 | Luescher | |
| 10,207,385 B2 | 2/2019 | Montplaisir et al. | |
| 10,517,212 B2 | 12/2019 | Haun | |
| 10,596,680 B2 | 3/2020 | Kim | |
| 10,682,714 B2 | 6/2020 | Rubens et al. | |
| 2005/0135886 A1 | 6/2005 | Scheuerman | |
| 2010/0263932 A1 * | 10/2010 | Wolfer | B23B 31/113 175/57 |
| 2011/0266759 A1 | 11/2011 | Goldman | |
| 2013/0193655 A1 | 8/2013 | Kaye, Jr. et al. | |
| 2019/0022816 A1 | 1/2019 | Kuehne et al. | |
| 2019/0039205 A1 | 2/2019 | Groth | |
| 2019/0143473 A1 | 5/2019 | Montplaisir et al. | |
| 2019/0184595 A1 * | 6/2019 | Fellmann | B27B 5/32 |
| 2019/0366578 A1 | 12/2019 | Zinge | |
| 2020/0156209 A1 | 5/2020 | Barth | |
| 2020/0246940 A1 | 8/2020 | Lee | |
| 2020/0324385 A1 | 10/2020 | Blatz et al. | |
| 2021/0016411 A1 | 1/2021 | Kuehne et al. | |
| 2021/0205944 A1 | 7/2021 | Kim | |

FOREIGN PATENT DOCUMENTS

| | | |
|---|---|---|
| CN | 211639397 U | 10/2020 |
| CN | 111890223 A | 11/2020 |
| DE | 102012007930 A1 | 10/2013 |
| EP | 1745889 A1 | 1/2007 |
| WO | 2012055646 A1 | 5/2012 |
| WO | 2012089637 A2 | 7/2012 |
| WO | 2013058249 A1 | 4/2013 |
| WO | 2013065614 A1 | 5/2013 |
| WO | 2018226068 A1 | 12/2018 |
| WO | 2020009305 A1 | 1/2020 |

* cited by examiner

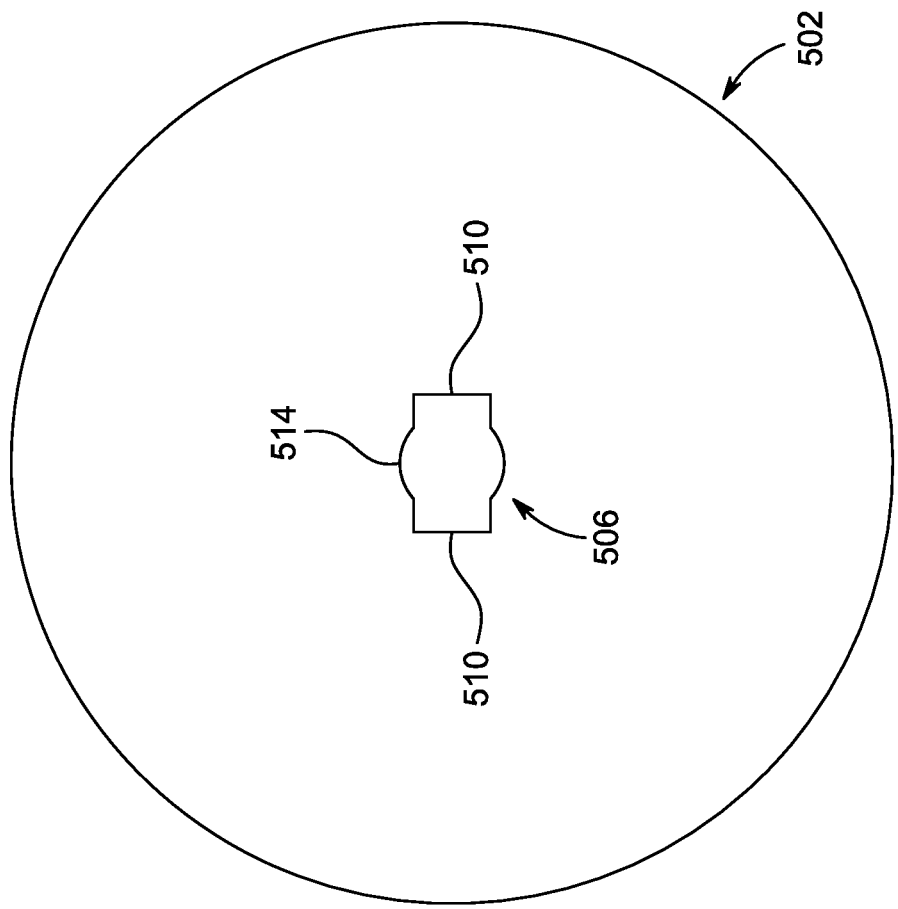

MANDREL AND ACCESSORY FOR ROTARY TOOL

CROSS-REFERENCE TO RELATED APPLICATIONS

This application claims the benefit of prior-filed, U.S. Provisional Patent Application No. 63/162,632, filed Mar. 18, 2021, and U.S. Provisional Patent Application No. 63/185,829, filed May 7, 2021. The entire contents of these applications are incorporated by reference.

TECHNICAL FIELD

The present disclosure relates to rotary tools, and more particularly to a connection interface for rotary tools.

Rotary tools typically include a housing supporting a motor for driving a mandrel or bit holder. The mandrel may be capable of supporting various types of accessories (e.g., bits, discs) to perform various functions (e.g., cutting, sanding or polishing objects, drill holes, etc.).

SUMMARY

The present disclosure provides, in one independent aspect, a mandrel is provided for facilitating quick coupling and decoupling of an accessory to a rotary tool.

In one independent aspect, a mandrel for a rotary tool includes a shaft, a locking projection, a collar coupled to the shaft, and a nut. The shaft extends along a longitudinal axis and includes a distal end. The locking projection is positioned adjacent the distal end of the shaft, and the locking projection protrudes radially relative to the longitudinal axis. The locking projection has a locking projection outer profile, and the locking projection outer profile is similar to a portion of a profile of a mating interface of an accessory. The collar includes a coupling feature, the coupling feature having a coupling outer profile that is similar to the locking projection outer profile. The nut is threadably coupled to the shaft to move the nut relative to the shaft along the longitudinal axis. Threading the nut causing the locking projection to move toward the coupling feature.

In another independent aspect, a mandrel for a rotary tool includes a shaft, a pair of locking projections, a collar coupled to the shaft, and a fastener coupled to the shaft. The shaft extends along a longitudinal axis and includes a distal end. The pair of locking projections are positioned adjacent the distal end of the shaft. The locking projections protrude radially relative to the longitudinal axis and are positioned on opposite sides of the longitudinal axis from one another. Each of the locking projections defines a locking projection outer profile configured to be similar to a portion of a profile of a mating interface of an accessory. The locking projection outer profile is rectilinear. The collar includes a pair of coupling projections protruding from a surface of the collar adjacent the distal end of the shaft. The coupling projections are angularly offset from the locking projections with respect to the longitudinal axis. Each of the coupling projections define a coupling projection outer profile configured to be similar to the portion of the profile of a mating interface of the accessory. The coupling projection outer profile is rectilinear. The fastener is movable relative to the shaft along the longitudinal axis, and movement of the fastener causing the locking projections to move toward the coupling projections.

In yet another independent aspect, an accessory for a rotary tool includes a cutting edge, and a mating interface configured to secure the accessory to a mandrel. The mating interface includes an opening having a first portion and a pair of second portions. The first portion is aligned with an axis of rotation, and the first portion having an arcuate profile. The second portions are positioned on opposite sides of the axis from one another. Each of the second portions is positioned adjacent a radially outward position along a periphery of the first portion, and each of the second portions has a rectilinear profile.

Other features and aspects of the disclosure will become apparent by consideration of the following detailed description and accompanying drawings.

BRIEF DESCRIPTION OF THE DRAWINGS

FIG. 15 is a plan view of the accessory of FIG. 14.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
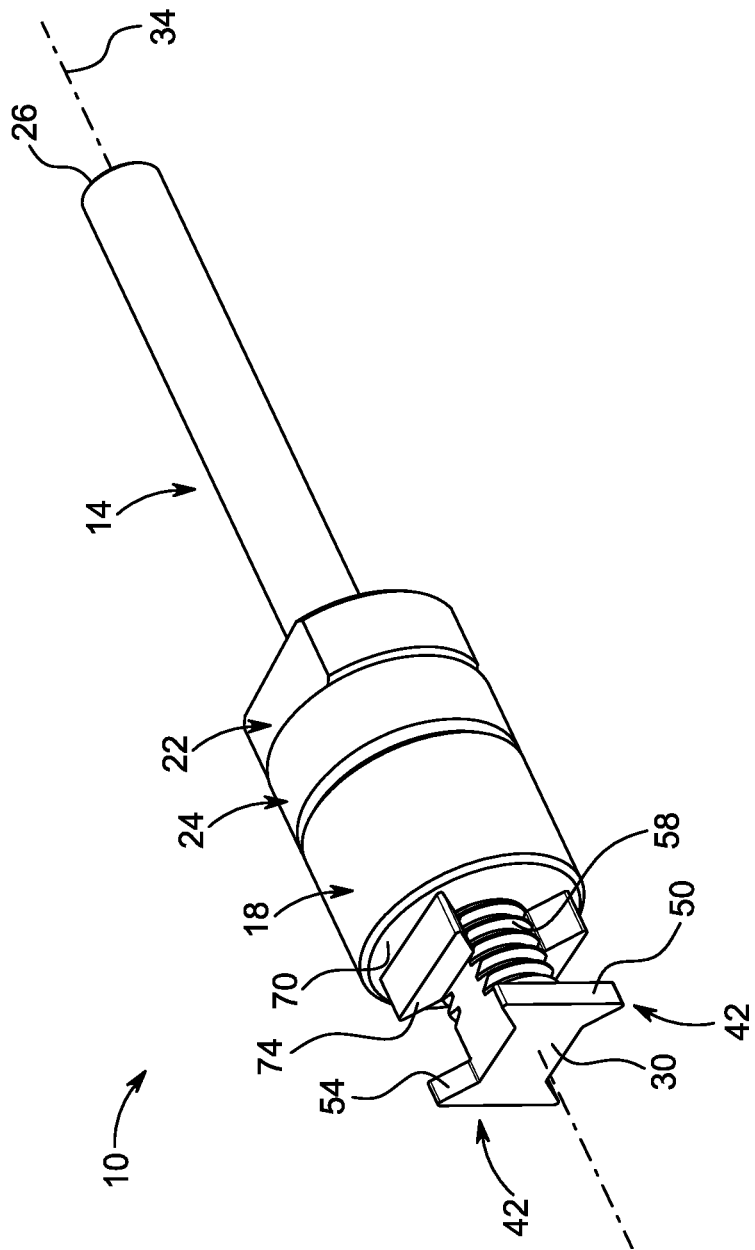
FIG. 1 is a perspective view of a mandrel.
Figure 2:
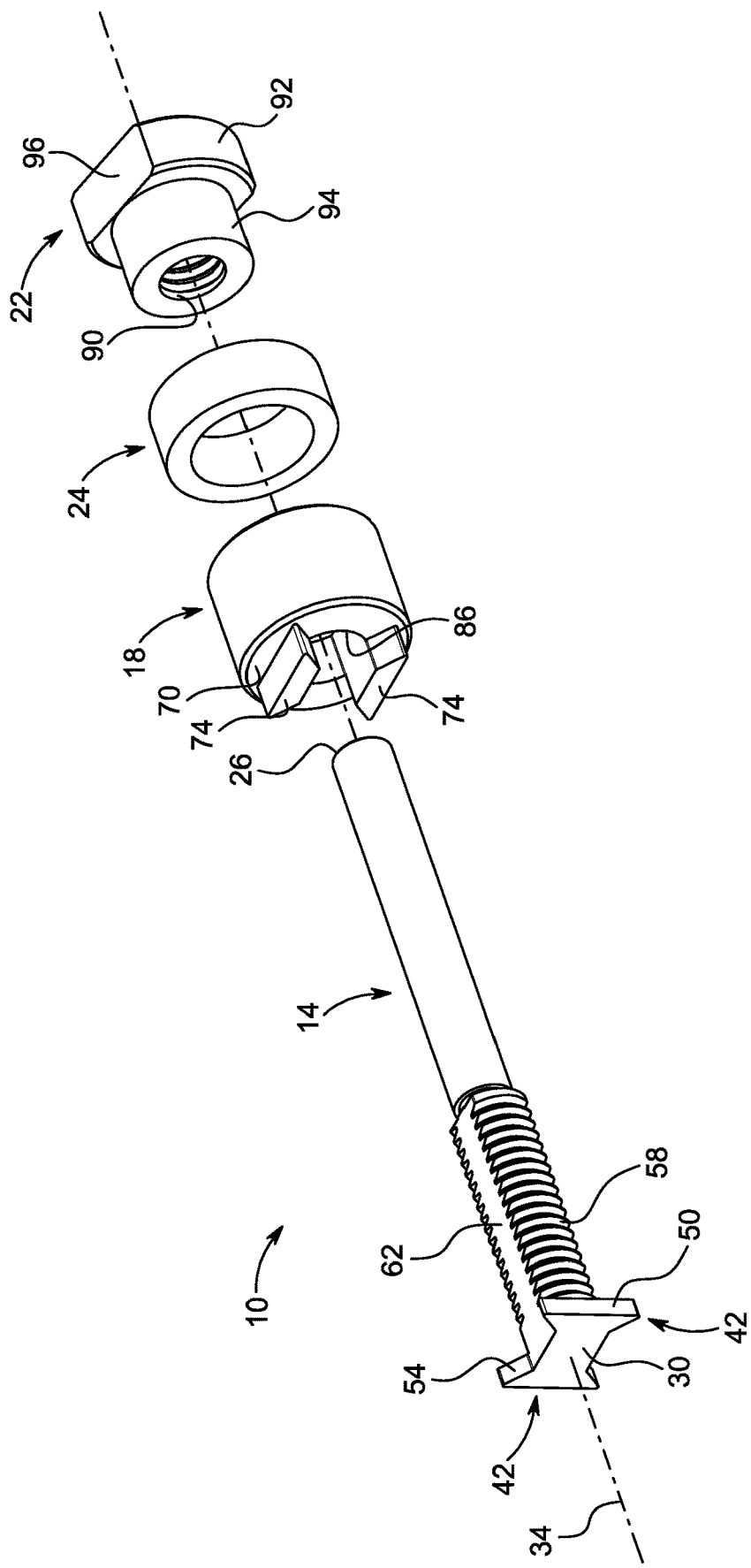
FIG. 2 is an exploded view of the mandrel of FIG. 1

FIGS. 1 and 2 illustrate a mandrel 10 (e.g., for a rotary tool or power tool). In the illustrated embodiment, the mandrel 10 includes a shaft 14, a collar 18, and a fastener or nut 22. In some embodiments, a washer 24 may be positioned between the collar 18 and the nut 22. The shaft 14 includes a proximal end or first end 26, a distal end or second end 30, and the shaft 14 extends along a longitudinal axis 34.

The first end 26 is configured to be coupled to a motor (not shown) of the rotary tool and driven to rotate. The shaft 14 may be subjected to a hardening process. Locking projections 42 are positioned adjacent the second end 30. In the illustrated embodiment, two locking projections 42 are positioned on opposite sides of the longitudinal axis 34, and the locking projections 42 are positioned in a plane oriented perpendicular to the longitudinal axis 34 of the shaft 14.

Figure 3:
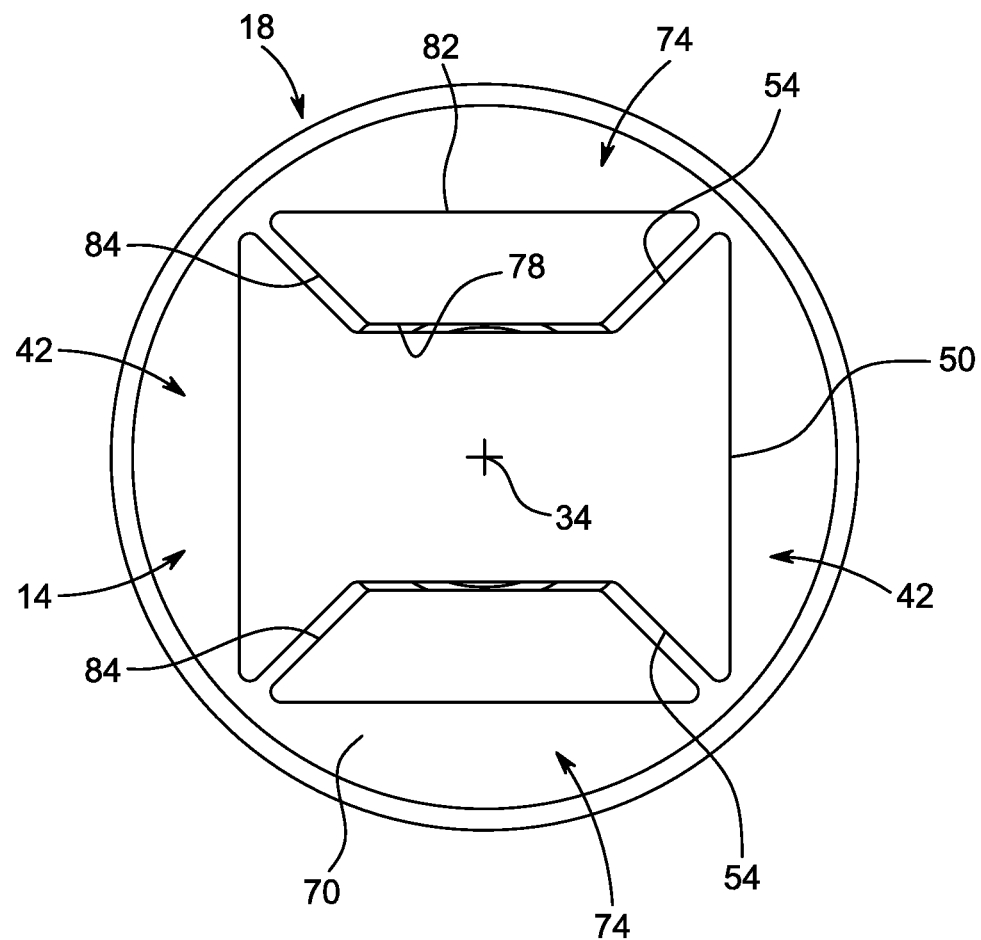
FIG. 3 is an end view of the mandrel of FIG. 1 in a locked position.

As shown in FIG. 3, each of the locking projections 42 is positioned at a periphery of the second end 30 of the shaft 14, and tapers inwardly toward the longitudinal axis 34. In some embodiments, an outer portion of each locking projection 42 has a trapezoidal profile. Stated another way, each of the locking projections 42 includes an outer planar surface 50, and planar sides 54 extend from the outer planar surface 50 inwardly toward one another. The width of each locking projection 42 increases as a radial distance from the longitudinal axis 34 increases. The locking projections 42 have a rectilinear profile, and are symmetric with respect to one another.

Referring again to FIG. 2, in the illustrated embodiment, the shaft 14 also includes a threaded portion 58 positioned proximate the locking projections 42. Planar portions 62 are positioned on opposite sides of the shaft 14 and extend along the threaded portion 58, dividing the threaded portion 58 into two separate threaded surfaces. The planar portions 62 of the shaft 14 are aligned between the planar sides 54 of separate locking projections 42.

As shown in FIG. 2, the collar 18 includes a first surface 70 positioned adjacent the locking projections 42. Coupling features are positioned on the first surface 70 of the collar 18. In the illustrated embodiment, the coupling features includes a pair of coupling projections 74 positioned on opposite sides of the longitudinal axis 34 from one another.

As best shown in FIG. 3, in the illustrated embodiment, each of the coupling projections 74 has a trapezoidal profile. A narrow side 78 of the trapezoidal profile is positioned proximate the longitudinal axis 34, and a wide side 82 of the trapezoidal profile is positioned at a radial outer position. Inclined or tapered surfaces 84 extend between the narrow side 78 and the wide side 82. When an accessory 102 (FIG. 4) is secured on the mandrel 10, the wide sides 82 and the tapered surfaces 84 of the coupling projections 74 transmit torque to the accessory 102 to rotate the accessory 102. The coupling projections 74 are aligned between the locking projections 42 (for example, between planar sides 54 of separate locking projections 42). In the illustrated embodiment, the narrow side 78 of the trapezoidal profile abuts one of the planar portions 62 of the shaft 14, limiting rotation of the collar 18 relative to the shaft 14. A distance between the narrow sides 78 of the coupling projections 74 is approximately equal to a distance between the planar portions 62 of the shaft 14. A distance between the wide sides 82 of the coupling projections 74 is approximately equal to a distance between the outer planar surfaces of the locking projections 42.

The collar 18 includes a bore 86 through which a portion of the shaft 14 extends, and the collar 18 is slidable along the shaft 14. When the collar 18 is moved to abut the locking projections 42, the coupling projections 74 are positioned between the locking projections 42, The coupling projections 74 are angularly offset from the locking projections 42 with respect to the axis 34. In the illustrated embodiment the coupling projections are angularly offset from the locking projections by ninety degrees, and the outermost edges of the coupling projections 74 and the locking projections 42 cooperate to form a substantially square or rectangular profile (FIG. 3).

As shown in FIG. 2, the nut 22 is threadably coupled to the threaded portion 58 of the shaft 14. In the illustrated embodiment, the nut 22 includes a threaded opening 90 through which a portion of the shaft 14 extends, and the nut 22 is positioned between the collar 18 and the second end 30 of the shaft 14. In the illustrated embodiment, the nut 22 includes a base portion 92 and a neck portion 94 having a smaller diameter than the base portion 92. The base portion 92 may include one or more flat surfaces 96 to assist in rotating the nut 22. As the nut 22 is threaded, the neck portion 94 is received within a counterbore portion 98 (FIG. 10) of the collar 18. The washer 24 may be positioned between the end surface of the collar 18 and the base portion 92 of the nut 22. Threading the nut 22 onto the shaft 14 causes the nut 22 to draw the collar 18 against the locking projections 42. Unthreading the nut 22 permits the collar 18 to be moved away from the locking projections 42. In some embodiments, the threaded portion 58 and the threaded opening 90 may be oriented to inhibit the nut 22 loosening as the shaft 14 is driven to rotate. For example, the threaded portion 58 and the threaded opening 90 may engage one another via a left-hand thread. Alternatively, the threaded portion 58 and the threaded opening 90 may engage one another via a right-hand thread.

Figure 4:
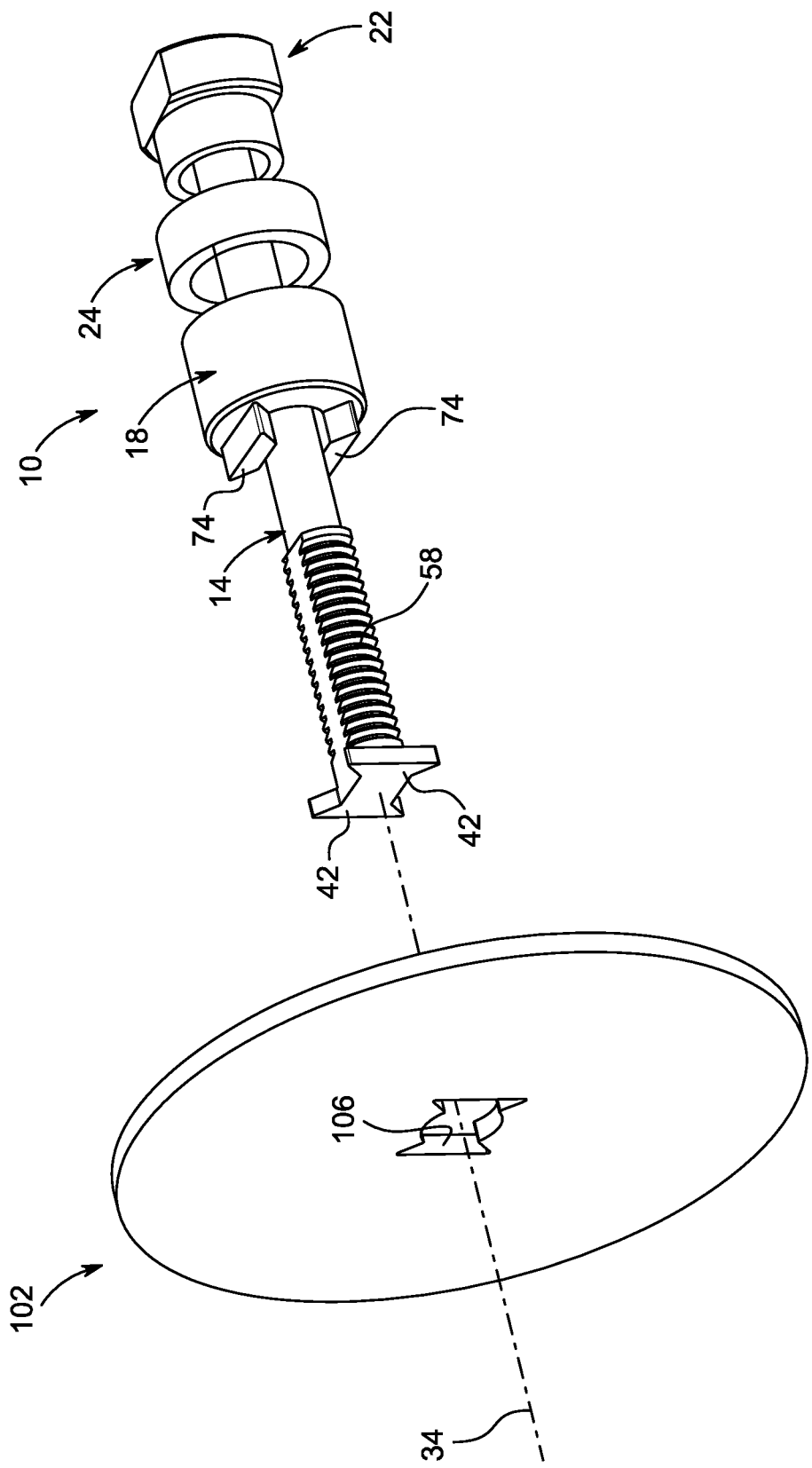
FIG. 4 is a perspective view of the mandrel of FIG. 1 and an accessory.
Figure 5:
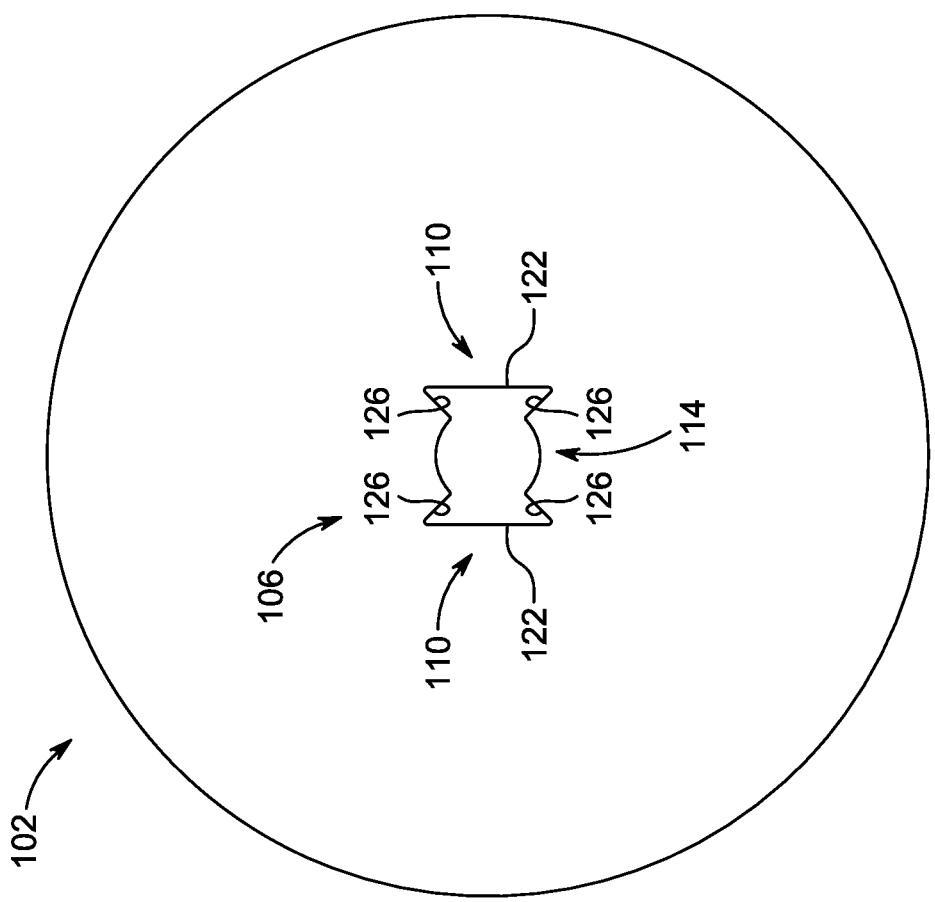
FIG. 5 is an end view of the accessory of FIG. 4.

As shown in FIGS. 4 and 5, an accessory 102 (e.g., a cutting disc) to be coupled to the shaft 14 includes an opening 106 that provides a mating interface with the mandrel and is similar in shape to the outer profile of the locking projections 42 and coupling projections 74. As shown in FIG. 5, in the illustrated embodiment, the opening 106 includes a first portion or intermediate portion 114 and two second portions or outer portions 110. The intermediate portion 114 is positioned between the outer portions 110 and is aligned with the longitudinal axis 34. Stated another way, the outer portions 110 are positioned adjacent a radially outward portion along a periphery of the intermediate portion 114. The outer portions 110 have a rectilinear profile that mirrors the shape of the outermost portions of the locking projections 42 and the coupling projections 74, while the intermediate portion 114 has an arcuate or round profile having a diameter that accommodates an outer diameter of the threaded portion 58 of the shaft 14.

In the illustrated embodiments, a radially outermost edge of each of the outer portions 110 has a substantially trapezoidal shape. Stated another way, each of the outer portions 110 has an outermost edge 122 and a pair of tapered edges 126 extending from the outermost edge 122 toward the intermediate portion 114, and the tapered edges 126 extend toward one another from the outermost edge 122 to the intermediate portion 114. In the illustrated embodiment, the accessory 102 is illustrated as a cutting disc; in other embodiments, the interface can be incorporated into another type of accessory.

Figure 6:
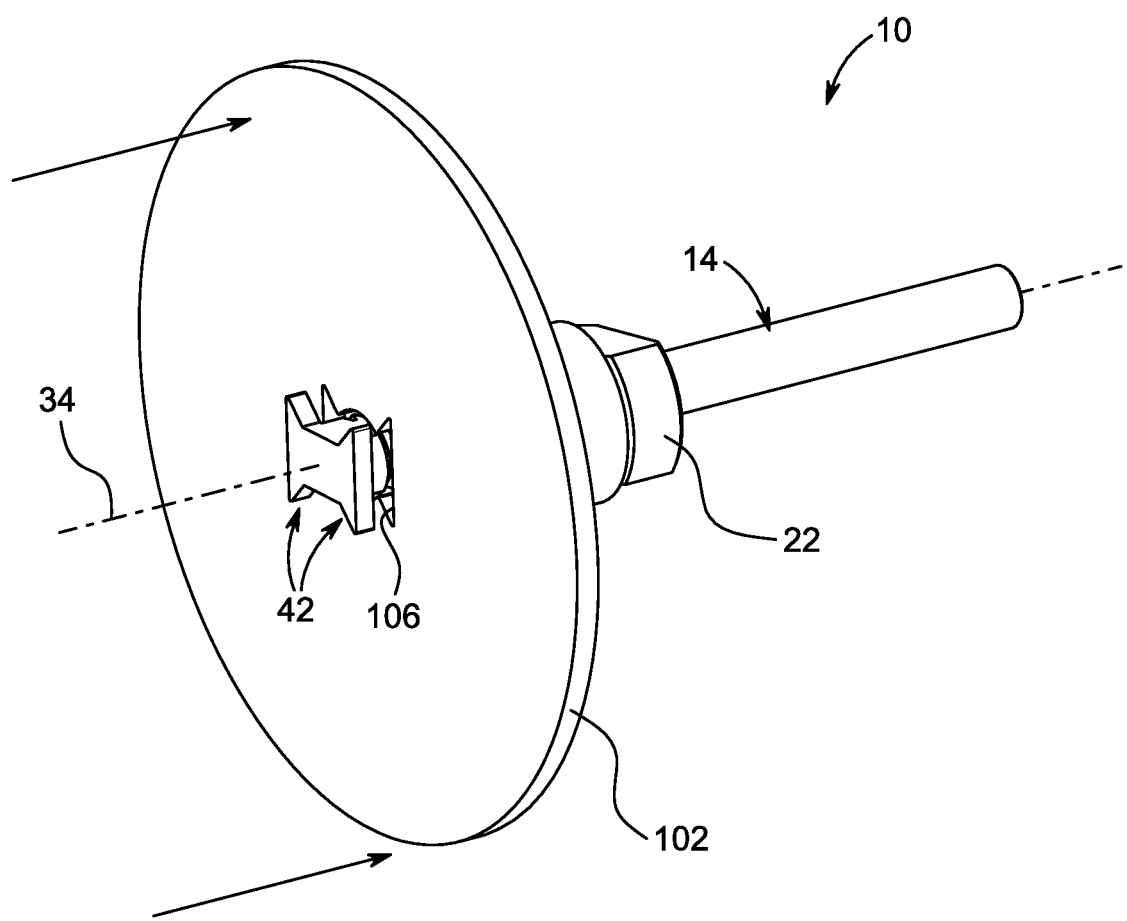
FIG. 6 is a perspective view of the mandrel and accessory of FIG. 2, with the accessory in a first position.
Figure 7:
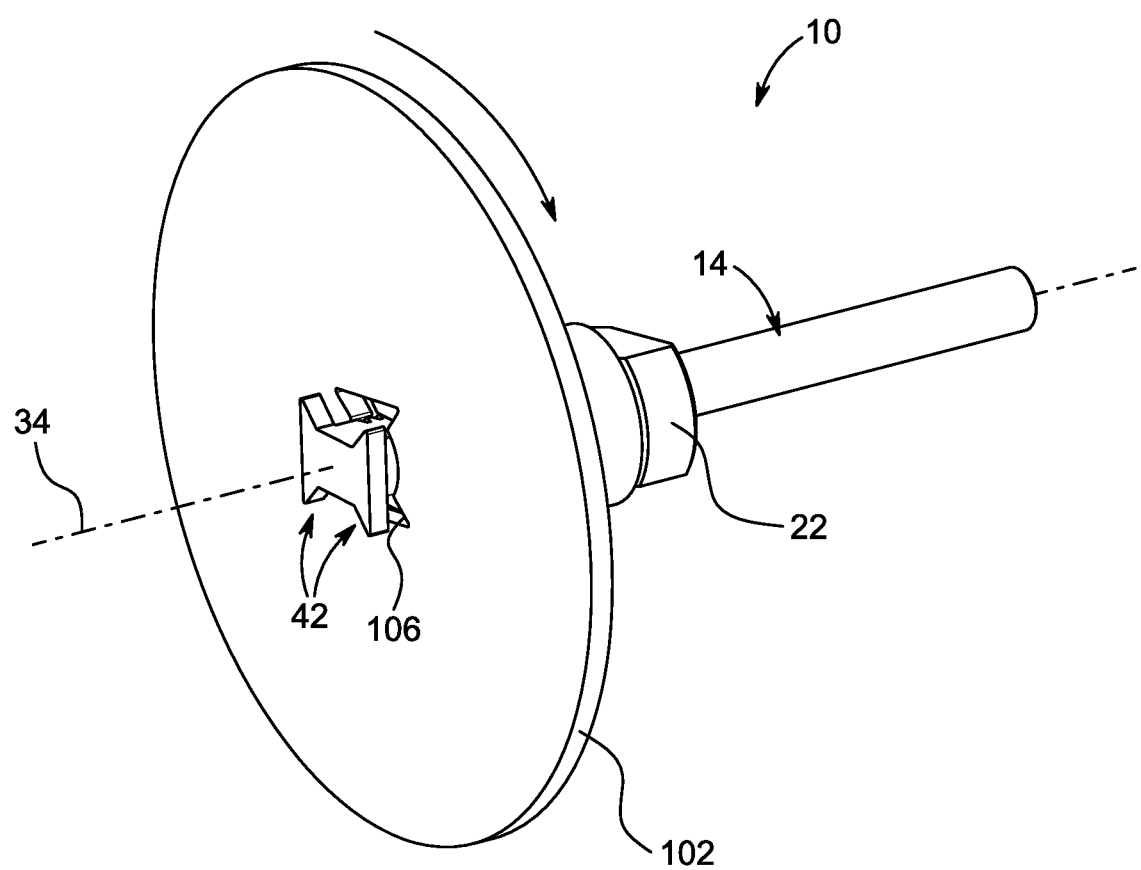
FIG. 7 is a perspective view of the mandrel and accessory of FIG. 2, with the accessory in a second position.
Figure 8:
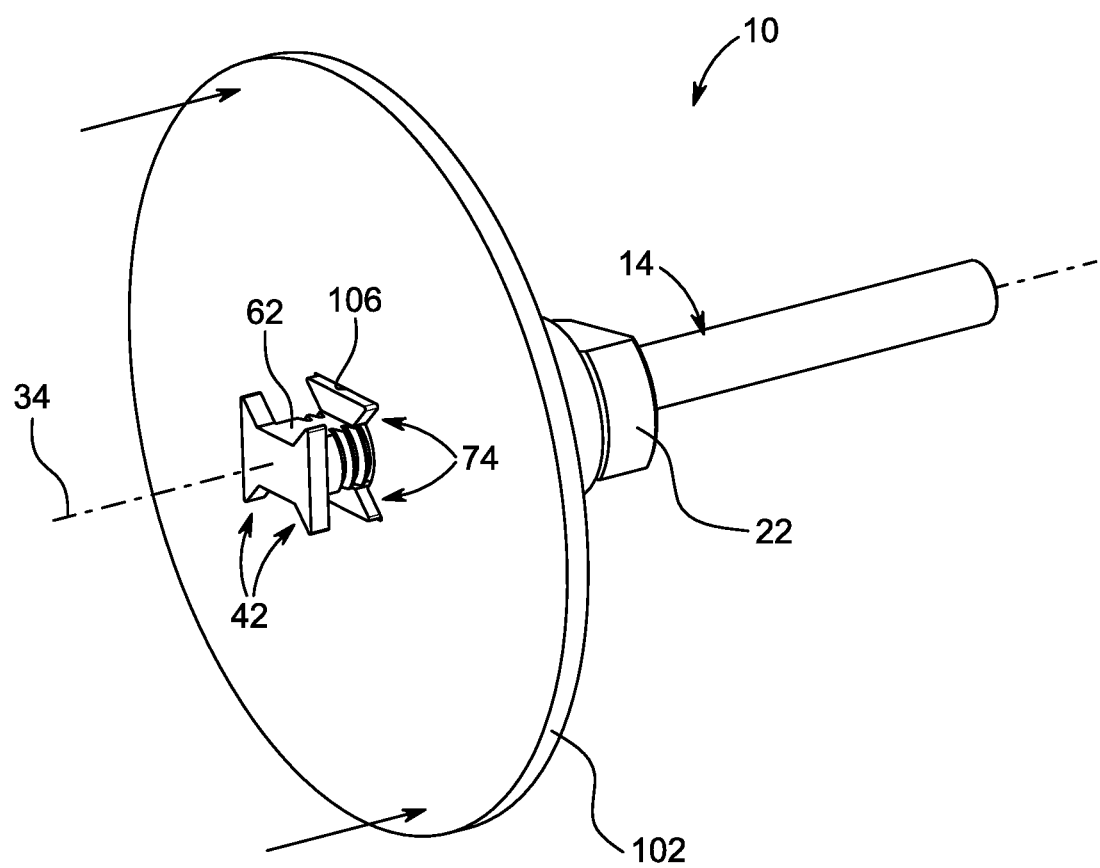
FIG. 8 is a perspective view of the mandrel and accessory of FIG. 2, with the accessory in a third position.

To couple the accessory 102 to the shaft 14, the opening 106 of the accessory 102 is positioned as shown in FIG. 4 such that the outer portions 110 of the opening 106 are aligned with the locking projections 42. In addition, the collar 18 is positioned such that the coupling projections 74 are spaced apart from the locking projections 42 by an axial distance that is at least equal to a thickness of the accessory 102 proximate the opening 106. As shown in FIG. 6, the accessory 102 is moved in a direction parallel to the longitudinal axis 34 such that the locking projections 42 pass through the opening 106 of the accessory 102. The accessory 102 is then rotated about the longitudinal axis 34 as shown in FIG. 7 so that the outer portions 110 of the accessory 102 opening 106 are axially aligned with the coupling projections 74 of the collar 18. In the illustrated embodiment, the accessory 102 is rotated approximately 90 degrees. The accessory 102 is then moved in a direction parallel to the longitudinal axis 34 as shown in FIG. 8 until the coupling projections 74 are positioned in the outer portions 110 of the accessory opening 106. Finally, the nut 22 is threaded relative to the shaft 14, thereby moving the collar 18 and the locking projections 42 toward one another. The accessory 102 may be uncoupled from the mandrel 10 by completing these steps in reverse order.

Figure 9:
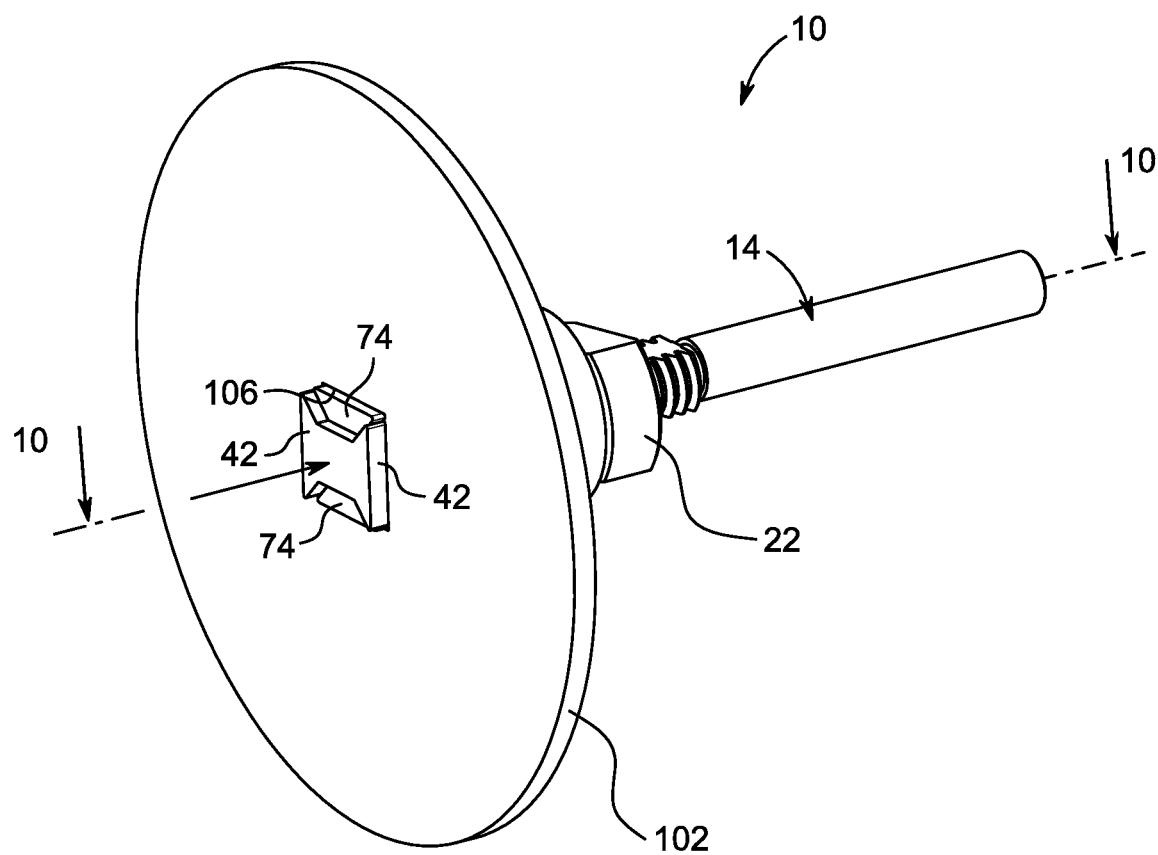
FIG. 9 is a perspective view of the mandrel and accessory of FIG. 2, with the accessory secured to the mandrel.
Figure 10:
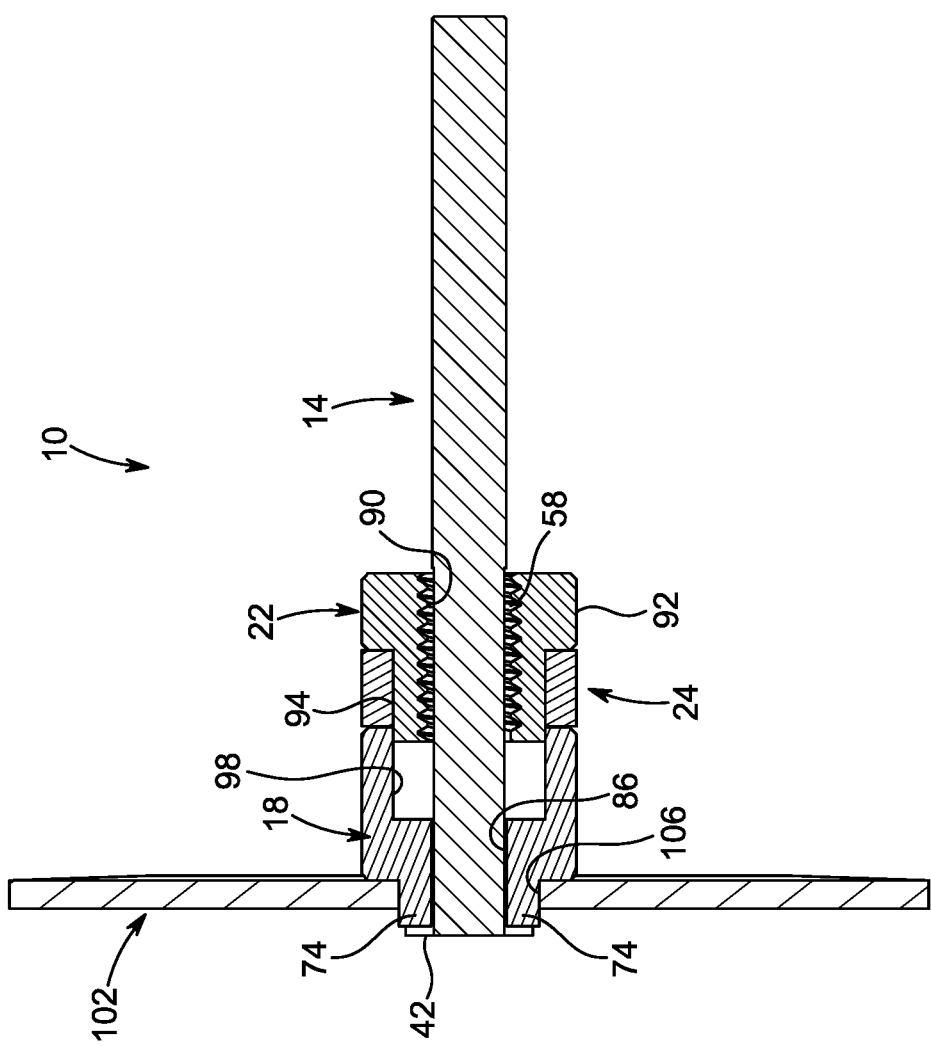
FIG. 10 is a section view of the mandrel and accessory of FIG. 9, viewed along section 10-10.

As shown in FIGS. 9 and 10, the locking projections 42 secure the coupling projections 74 within the outer portions 110 of the opening 106. In some embodiments, the coupling projections 74 may extend through the opening 106 such that a portion of the coupling projections 74 protrudes from the forward plane of the disc 102.

FIGS. 11-15 illustrate a mandrel 410 according to another embodiment. The mandrel 410 is similar in some aspects to the mandrel 10 described with respect to FIGS. 1-10, and similar features are identified with similar reference numbers, plus 400. Some similarities and differences of the mandrel 410 are described herein.

Figure 11:
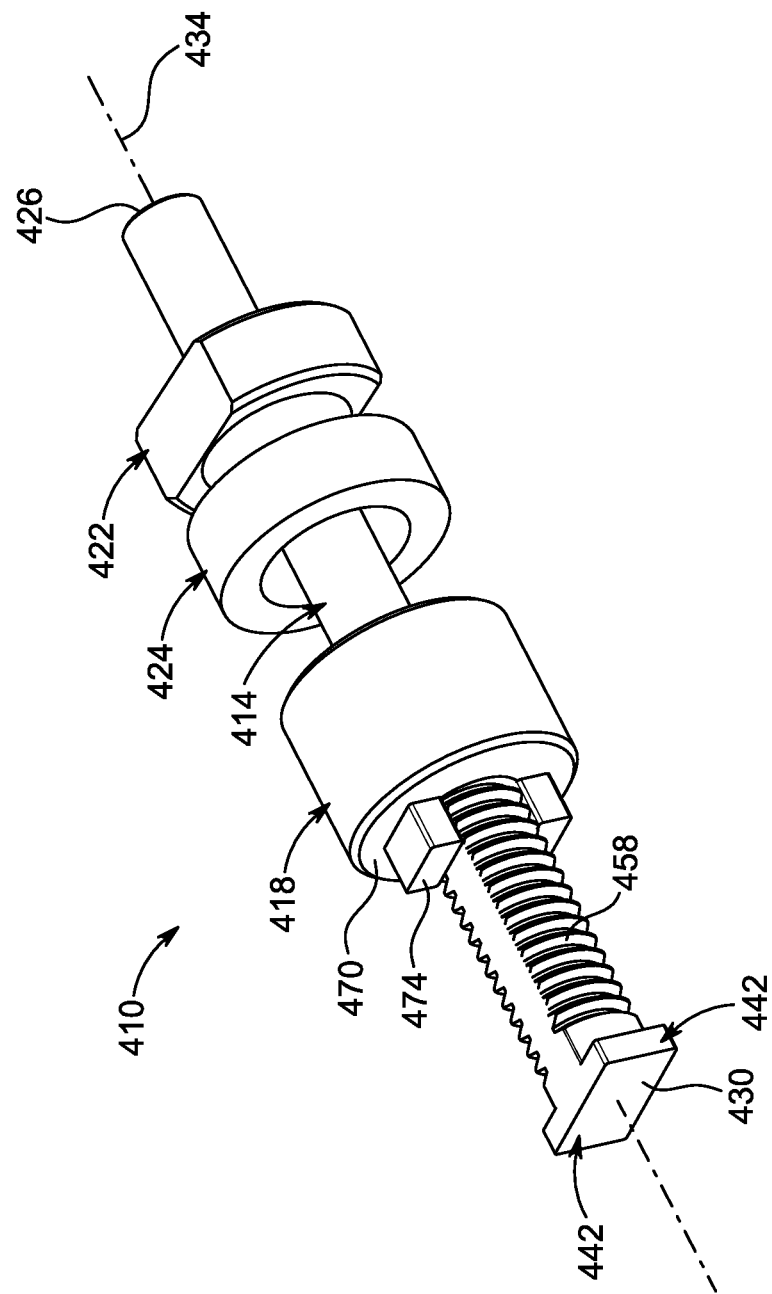
FIG. 11 is a perspective view of a mandrel according to another embodiment.
Figure 12:
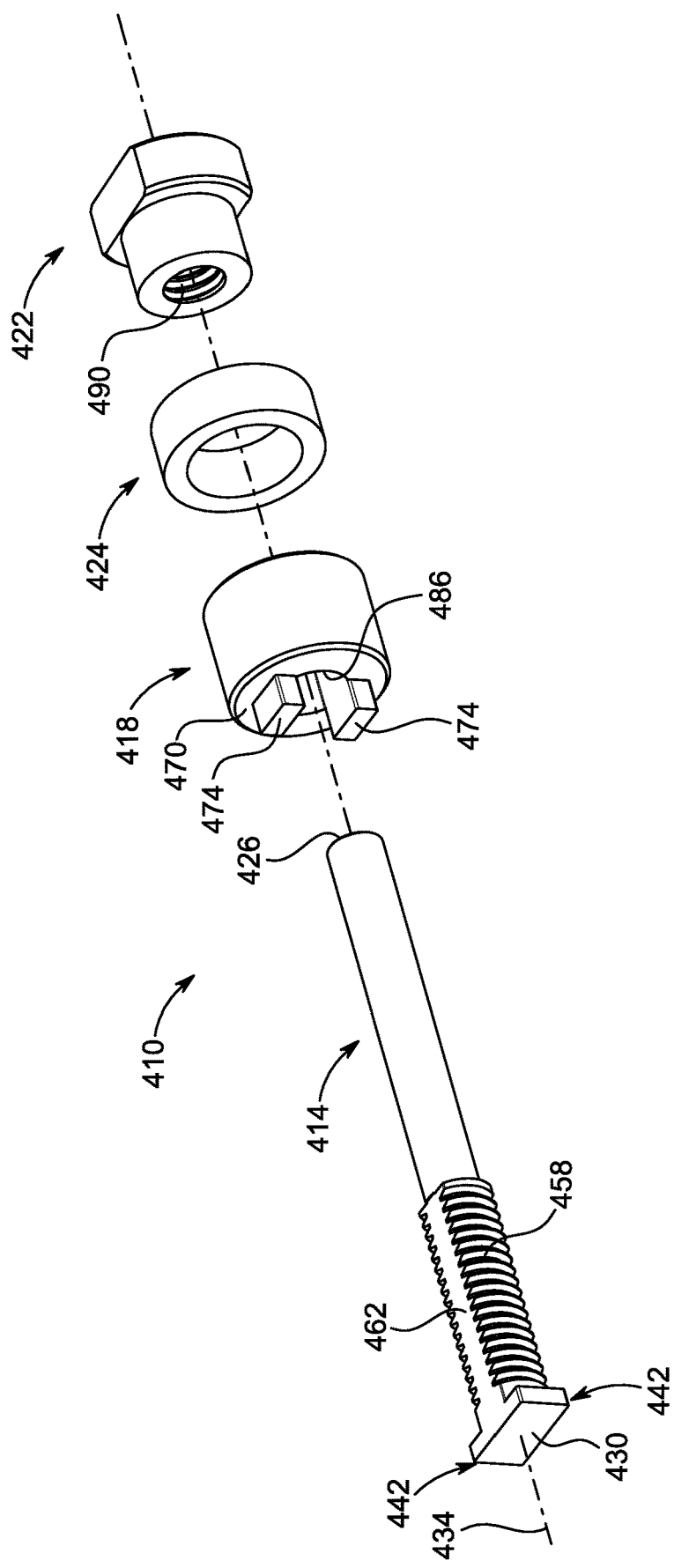
FIG. 12 is an exploded view of the mandrel of FIG. 11.

As shown in FIGS. 11-12, the mandrel 410 includes a shaft 414, a collar 418, and a nut 422. In some embodiments, a washer 424 may be positioned between the collar 418 and the nut 422. The shaft 414 includes a proximal end or first end 426, a distal end or second end 430, and the shaft 14 extends along a longitudinal axis 434. Locking projections 442 are positioned adjacent the second end 430. In the illustrated embodiment, two locking projections 442 are positioned on opposite sides of the longitudinal axis 434, and the locking projections 442 are positioned in a plane oriented perpendicular to the longitudinal axis 434 of the shaft 414.

Figure 13:
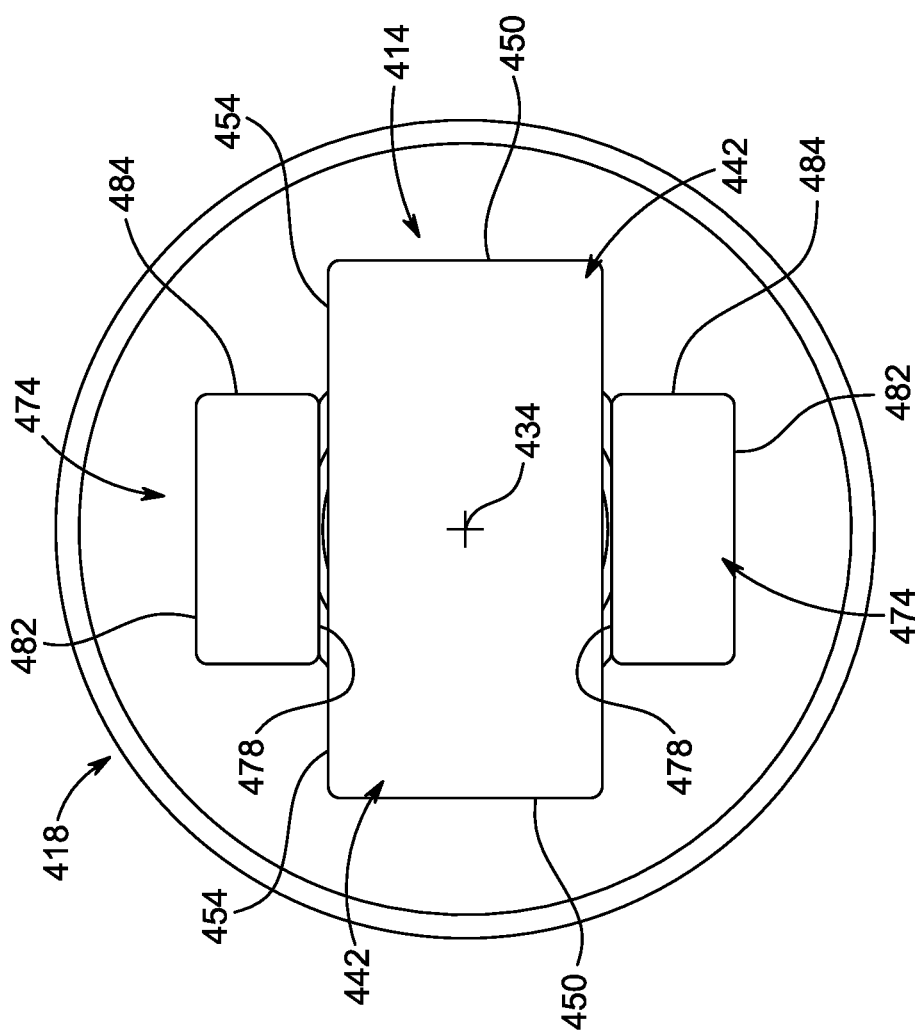
FIG. 13 is an end view of the mandrel of FIG. 11 in a locked position.

As shown in FIG. 13, each of the locking projections 442 is positioned at a periphery of the second end 430 of the shaft 414. In the illustrated embodiment, an outer portion of each locking projection 442 has a rectilinear profile, and specifically a rectangular profile. Stated another way, each of the locking projections 442 includes an outer planar surface 450. The sides 454 of each locking projections 442 is oriented perpendicular to the outer planar surface 450. In the illustrated embodiment, the side 454 of one locking projection 442 is coplanar with a corresponding side of the other locking projection 442. The locking projections 42 are symmetric with respect to one another.

Referring again to FIG. 12, in the illustrated embodiment, the shaft 414 also includes a threaded portion 458 positioned proximate the locking projections 442. Planar portions 462 are positioned on opposite sides of the shaft 414 and extend along the threaded portion 458, dividing the threaded portion 458 into two separate threaded surfaces. In the illustrated embodiment, the planar portions 462 of the shaft 414 are coplanar with the sides 454 (FIG. 13) of the locking projections 42.

As shown in FIG. 12, the collar 418 includes a first surface 470 positioned adjacent the locking projections 442. Coupling features are positioned on the first surface 470 of the collar 418. In the illustrated embodiment, the coupling features includes a pair of coupling projections 474 positioned on opposite sides of the longitudinal axis 434 from one another.

As shown in FIGS. 11 and 12, the nut 422 is threadably coupled to the threaded portion 458 of the shaft 414. In the illustrated embodiment, the nut 422 includes a threaded opening 490 through which a portion of the shaft 414 extends. Threading the nut 422 onto the shaft 414 causes the nut 422 to draw the collar 418 against the locking projections 442. Unthreading the nut 422 permits the collar 418 to be moved away from the locking projections 442. In some embodiments, the threaded portion 458 and the threaded opening 490 may be oriented to inhibit the nut 422 loosening as the shaft 414 is driven to rotate. For example, the threaded portion 458 and the threaded opening 490 may engage one another via a left-hand thread. Alternatively, the threaded portion 458 and the threaded opening 490 may engage one another via a right-hand thread.

As best shown in FIG. 13, in the illustrated embodiment, each of the coupling projections 474 has a rectangular profile. An inner surface 478 of the rectangular profile is positioned proximate the longitudinal axis 434, and an outer surface 482 of the rectangular profile is positioned at a radial outer position. Side surfaces 484 extend between the inner surface 478 and the outer surface 482. When an accessory 502 (FIG. 14) is secured on the mandrel 410, the outer surfaces 482 and the side surfaces 484 of the coupling projections 474 transmit torque to the accessory 502 to rotate the accessory 502. The coupling projections 474 are angularly offset from the locking projections 442 with respect to the axis 434. The coupling projections 474 and the locking projections 442 cooperate to form a cross-shaped profile. In the illustrated embodiment, each of the inner surfaces 478 abuts an associated one of the planar portions 462 of the shaft 414, limiting rotation of the collar 418 relative to the shaft 414. A distance between the inner surfaces 478 of the coupling projections 474 is approximately equal to a distance between the planar portions 462 of the shaft 414. A distance between the outer surfaces 482 of the coupling projections 474 is approximately equal to a distance between the outer planar sides 450 of the locking projections 442.

Figure 14:
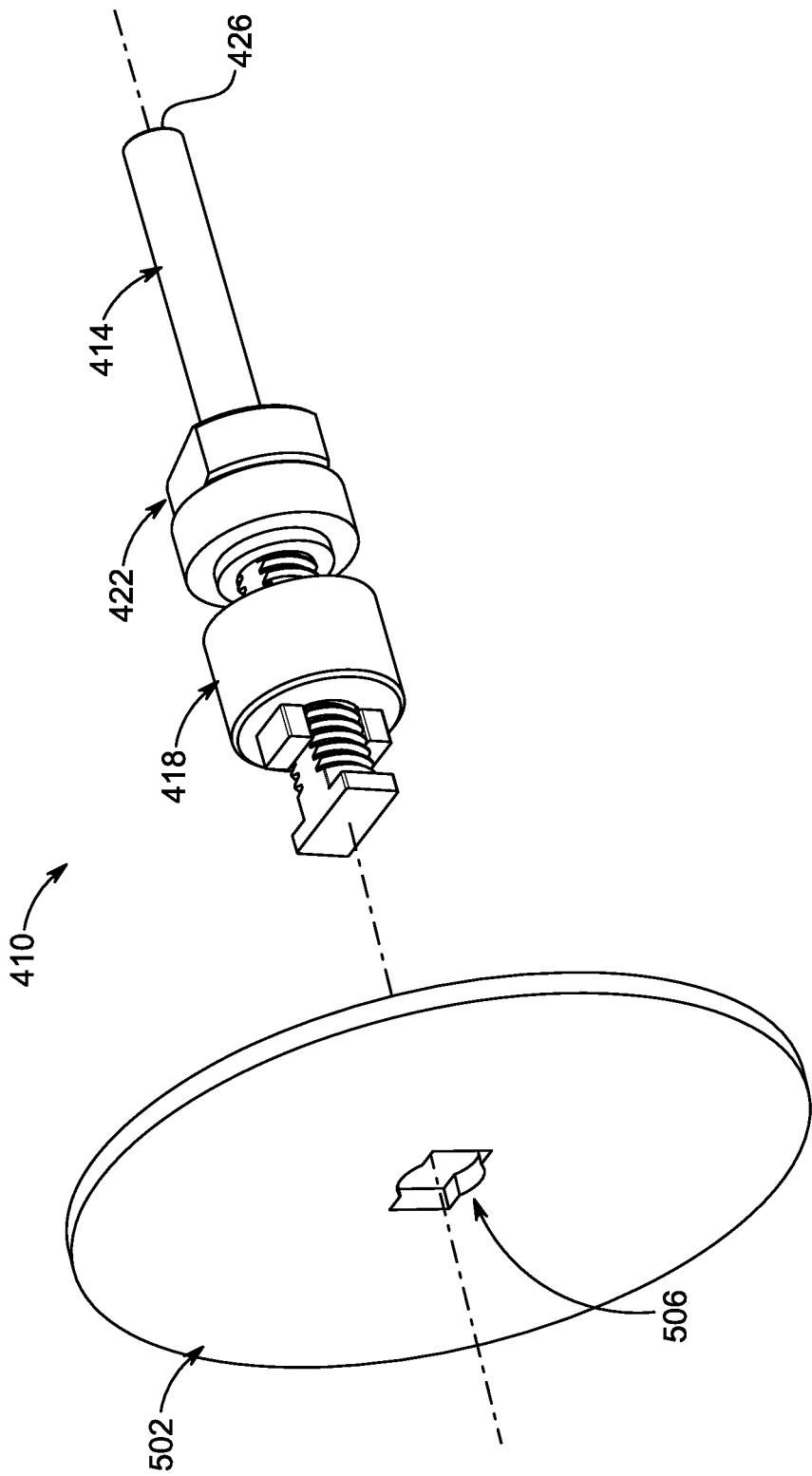
FIG. 14 is a perspective view of the mandrel of FIG. 11, and an accessory according to another embodiment.

As shown in FIGS. 14 and 15, an accessory 502 (e.g., a cutting disc) to be coupled to the shaft 414 includes an opening 506 that is similar in shape to the outer profile of the locking projections 442 and coupling projections 474. As shown in FIG. 15, in the illustrated embodiment, the opening 506 includes two outer portions 510 and an intermediate portion 514 positioned between the outer portions 510. The outer portions 510 have a rectilinear profile that mirrors the shape of the outermost portions of the locking projections 442 and the coupling projections 474 (FIG. 13), while the intermediate portion 514 has an arcuate or round profile having a diameter that accommodates an outer diameter of the threaded portion 458 (FIG. 12) of the shaft 414. In the illustrated embodiment, the accessory 502 is illustrated as a cutting disc; in other embodiments, the interface can be incorporated into another type of accessory. It is understood that the accessory 502 can be coupled and uncoupled from the mandrel 410 in a similar manner as described and shown with respect to the mandrel 10.

Although aspects have been described in detail with reference to certain embodiments, variations and modifications exist within the scope of one or more independent aspects as described.

What is claimed is:

1. A mandrel for a rotary tool, the mandrel comprising: a shaft extending along a longitudinal axis and including a distal end; a locking projection positioned adjacent the distal end of the shaft, the locking projection protruding radially relative to the longitudinal axis, the locking projection having a locking projection outer profile that is similar to a portion of a profile of a mating interface of an accessory; a collar coupled to the shaft, the collar including a coupling feature, the coupling feature having a coupling outer profile that is similar to the locking projection outer profile; and a nut threadably coupled to the shaft to move the nut relative to the shaft along the longitudinal axis, threading the nut causing the locking projection to move toward the coupling feature; wherein the collar is movable to interlock the coupling feature with the locking projection when a rotary tool is secured on the mandrel.

2. The mandrel of claim 1, wherein the locking projection includes a pair of locking projections positioned in a plane oriented perpendicular to the longitudinal axis of the shaft, each of the locking projections having a rectilinear outer profile.

3. The mandrel of claim 2, wherein each of the locking projections has a rectangular outer profile.

4. The mandrel of claim 2, wherein each of the locking projections has a trapezoidal outer profile.

5. The mandrel of claim 1, wherein the locking projection includes a pair of locking projections positioned on opposite sides of the longitudinal axis from one another, each of the locking projections having a trapezoidal outer profile, wherein the coupling feature includes a pair of trapezoidal coupling projections positioned on opposite sides of the longitudinal axis from one another, the coupling projections being angularly offset from the locking projections by ninety degrees with respect to the longitudinal axis.

6. The mandrel of claim 1, wherein the coupling feature includes a pair of rectangular coupling projections positioned on opposite sides of the longitudinal axis from one another, the coupling projections being angularly offset from the locking projection with respect to the longitudinal axis of the shaft, the coupling projections and the locking projection cooperating to form a cross-shaped outer profile while the locking projection is drawn against the coupling projections.

7. The mandrel of claim 1, wherein the shaft and the nut engage one another via a left hand thread.

8. The mandrel of claim 1, wherein the shaft includes an externally threaded surface and the nut includes an internally threaded surface that engages the externally threaded surface such that rotation of the nut about the longitudinal axis moves the nut with respect to the shaft along the longitudinal axis.

9. The mandrel of claim 1, wherein the collar is coupled to the shaft and is fixed against rotation relative to the shaft about the longitudinal axis.

10. A mandrel for a rotary tool, the mandrel comprising:
a shaft extending along a longitudinal axis and including a distal end;
a locking projection positioned adjacent the distal end of the shaft, the locking projection protruding radially relative to the longitudinal axis, the locking projection having a locking projection outer profile that is similar to a portion of a profile of a mating interface of an accessory;
a collar coupled to the shaft, the collar including a coupling feature, the coupling feature having a coupling outer profile that is similar to the locking projection outer profile; and
a nut threadably coupled to the shaft to move the nut relative to the shaft along the longitudinal axis, threading the nut causing the locking projection to move toward the coupling feature;
wherein the coupling feature includes a pair of trapezoidal coupling projections positioned on opposite sides of the longitudinal axis from one another, the coupling projections being angularly offset from the locking projection with respect to the longitudinal axis of the shaft, the coupling projections and the locking projection cooperating to form a rectangular outer profile while the locking projection is drawn against the coupling projections.

11. A mandrel for a rotary tool, the mandrel comprising:
a shaft extending along a longitudinal axis and including a distal end;
a pair of locking projections positioned adjacent the distal end of the shaft, the locking projections protruding radially relative to the longitudinal axis and positioned on opposite sides of the longitudinal axis from one another, each of the locking projections defining a locking projection outer profile configured to be similar to a portion of a profile of a mating interface of an accessory, the locking projection outer profile being rectilinear;
a collar coupled to the shaft, the collar including a pair of coupling projections protruding from a surface of the collar adjacent the distal end of the shaft, the coupling projections angularly offset from the locking projections with respect to the longitudinal axis, each of the coupling projections defining a coupling projection outer profile configured to be similar to the portion of the profile of the mating interface of the accessory, the coupling projection outer profile being rectilinear; and
a fastener coupled to the shaft and movable relative to the shaft along the longitudinal axis, movement of the fastener causing the locking projections to move toward the coupling projections;
wherein when the accessory is secured on the mandrel, the coupling projections interlock with the locking projections.

12. The mandrel of claim 11, wherein the locking projections are positioned in a plane oriented perpendicular to the longitudinal axis of the shaft.

13. The mandrel of claim 11, wherein each of the locking projections has a rectangular outer profile.

14. The mandrel of claim 11, wherein each of the coupling projections has a rectangular outer profile, the coupling projections angularly offset from the locking projections by ninety degrees with respect to the longitudinal axis.

15. The mandrel of claim 11, wherein each of the locking projections has a trapezoidal outer profile.

16. The mandrel of claim 15, wherein each of the coupling projections has a trapezoidal outer profile that is complementary to the trapezoidal outer profile of the locking projections, the coupling projections angularly offset from the locking projections by ninety degrees with respect to the longitudinal axis.

17. The mandrel of claim 11, wherein the fastener is a nut threadably coupled to the shaft to move the nut relative to the shaft along the longitudinal axis, threading the nut causing the locking projections to move toward the coupling projections.

18. The mandrel of claim 17, wherein the shaft and the nut engage one another via a left hand thread.

19. The mandrel of claim 11, wherein the shaft includes a threaded portion and a pair of planed surfaces and wherein the pair of coupling features of the collar each engage one of the pair of planed surfaces to inhibit rotation between the shaft and the collar.

20. The mandrel of claim 11, wherein the fastener is rotatably coupled to the shaft and wherein rotation of the fastener relative to the shaft about the longitudinal axis moves the fastener along the longitudinal axis relative to the shaft.

21. The mandrel of claim 11, wherein when the accessory is secured on the mandrel, the coupling projections are positioned between the locking projections within a plane extending in a radial direction relative to the longitudinal axis.

* * * * *